2,874,656
LIQUID FERTILIZER SUBSOIL INJECTOR

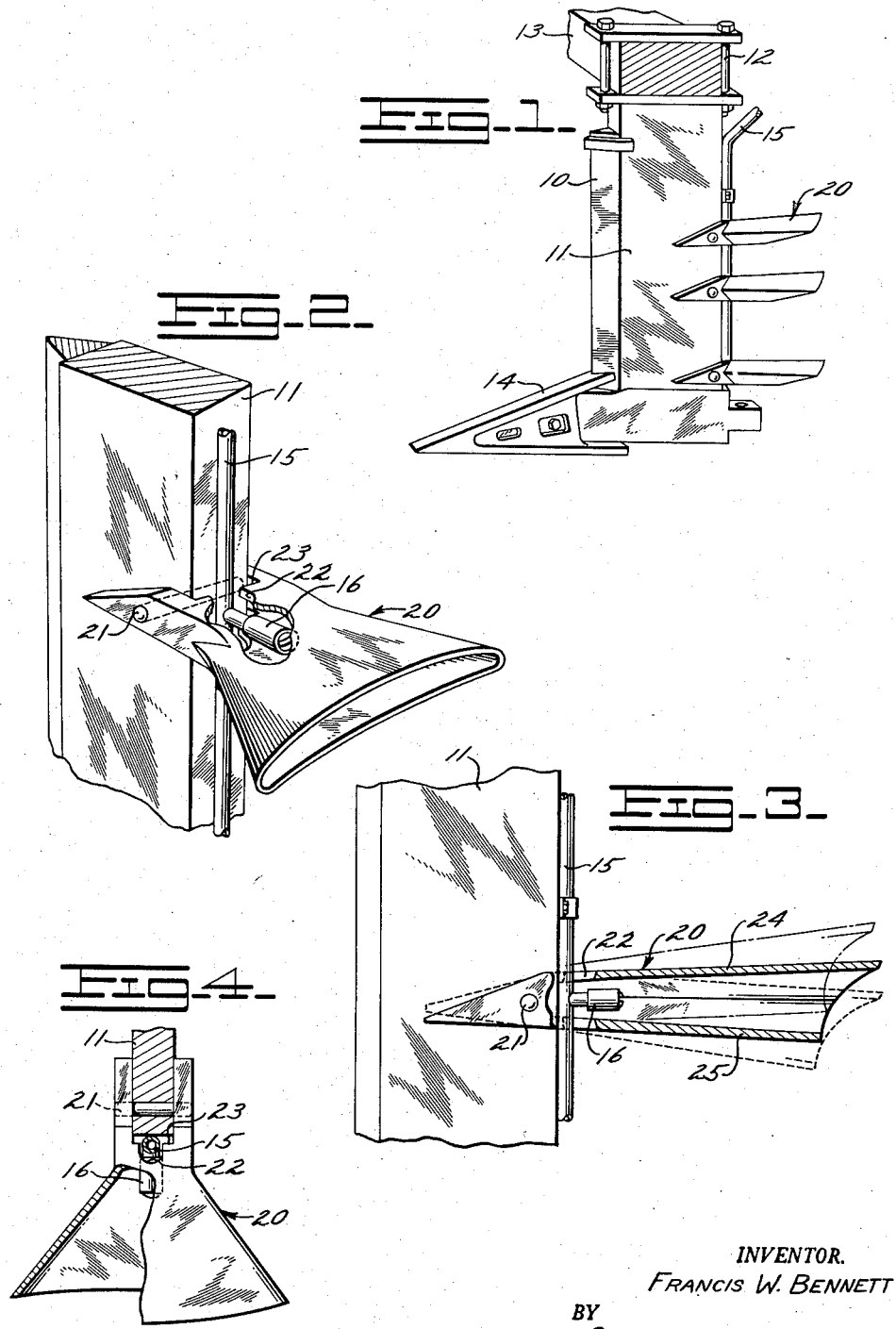

Francis W. Bennett, Sikeston, Mo., assignor, by mesne assignments, to Caterpillar Tractor Co., Peoria, Ill., a corporation of California Application January 17, 1956, Serial No. 559,581

2 Claims. (Cl. 111—7)

This invention relates to means for dispensing fluid materials in subsoil and in particular is concerned with apparatus for distributing liquid fertilizer in a predetermined pattern at spaced levels below the surface of the soil.

In the past, it has been conventional practice to spray liquid fertilizer over the surface of the ground. This method is unsatisfactory due to evaporation and the fact that subsequent precipitation may wash away much of the remaining fertilizer. Surface spraying also results in a high concentration of fertilizer near the surface of the soil with relatively little deep penetration. Agronomists have found that deep placement of fertilizer is extremely beneficial to plant growth, but prior to this invention no practical tool has been devised for distributing liquid fertilizer in a desired impregnation pattern at various predetermined levels below the surface of the soil. Likewise, in apparatus previously used in liquid fertilizer distribution, there is no controlled soil fracture to aid in defusing the fertilizer and the spray nozzles employed are also subject to clogging and damage.

It is an object of the present invention therefore to provide an attachment for tillage tools for distributing liquid fertilizer at spaced levels below the surface of the ground.

It is a further object of this invention to provide an attachment for distributing liquid fertilizer in which the fertilizer is sprayed into the soil in a desired impregnation pattern.

It is a still further object to provide a means of preventing damage and clogging of the spray nozzle as well as creating a horizontal fracture or void in the soil as an aid in dispersing the fertilizer.

In the drawings:

Fig. 1 is a perspective view of the liquid fertilizer distributor of the subject invention attached to a conventional deep tillage tool;

Fig. 2 is an enlarged perspective view with parts broken away showing the liquid dispersing structure in more detail;

Fig. 3 is a view in side elevation with parts broken away showing the preferred method of attaching the subject invention to a tillage tool; and Fig. 4 is a view in plan with parts broken away.

In Fig. 1 a conventional deep tillage tool, commonly known as a subsoiler, is shown at 10 as comprising a shank 11, the upper end of which is attached as by bolts 12 to a tool bar 13 or other means such as the draw bar of a tractor for advancing the subsoiler through the ground. As the subsoiler is advanced through the ground a tooth portion 14 supported at the lower end of the shank 11 penetrates the ground at a preselected depth so that the subsoil is shattered.

A conduit 15 is attached to the rearward side of the tillage tool 10 and is in communication with a suitable regulated pressurized source of supply (not shown) of the liquid fertilizer. One or more spray nozzles 16 for dispensing the liquid fertilizer are attached to that portion of the conduit 15 extending downwardly of the tillage tool. When more than one nozzle is employed, the vertical spacing between them may be as desired.

As shown in Figs. 2, 3, and 4, a laterally flared protective shield indicated generally at 20 is provided at the location of each spray nozzle. The shield 20 is shown as being pivotally attached to the tillage tool by means of pin 21 in order that the shield may be free to yield or float over small stones or other obstacles and to ride more freely through the ground. To prevent pinching and restriction of the conduit 15 by the shield 20 as it yields to irregularities in the soil, a recess 22 slightly larger than the conduit 15 is provided in the shield. In this manner, sufficient clearance exists between the conduit and the shield to allow the shield to pivot without damaging the conduit. Shoulders 23 are provided to restrict the pivotal movement of the shield 20 to prevent pinching or damage to the conduit. The forwardly extended portions of the shield 20 are wedge-shaped to aid in shearing the soil and thus reduce the amount of power necessary to advance the tillage tool through the soil. The trailing portion of the shield is flared laterally to enable distribution of the fertilizer in a wide band. Assuming constant fluid pressure and soil conditions as the fertilizer is discharged from the nozzle, the width of the fertilizer pattern deposited in the soil may be varied by using shields of varying widths. The depth of the pattern may also be varied in a similar manner.

As the tillage tool is advanced through the soil, a fracture or fissure is created at the trailing edge of each shield and the forming of this fissure greatly assists in the thorough dispersal of the fertilizer. The fertilizer is discharged a sufficient distance behind the tillage tool so that the fracture created by the advancement of the tillage tool through the ground is partially closed by the flow of shattered soil around it. In this manner, fertilizer discharged from the shield can flow freely into fractures formed by the shield but will not flow to the bottom of the fracture created by the tillage tool previously described.

As the tillage tool 10 is raised out of the ground, it assumes an upward direction of travel. In order to prevent the shield 20 from being fouled with dirt during this arcuate movement of the tillage tool, its top 24 extends in overhanging relationship to the bottom 25. The overhanging top edge also insures time for dispersal of the fertilizer before the fissure closes behind the shield.

I claim:

1. A fertilizer attachment for the draft beam of an agricultural vehicle comprising a tillage tool to be advanced through the soil, a conduit secured to the tillage tool for conveying liquid fertilizer under pressure, vertically spaced spray nozzles attached to said conduit, and a protective shield with a rearwardly flaring portion of greater width than the tillage tool attached to said tillage tool in surrounding relationship to each of said spray nozzles for distributing liquid fertilizer at different levels in the fissures created by said shield below the surface of the soil.

2. In combination with a spray nozzle for liquid fertilizer distributors attached to the trailing edge of a tillage implement which is drawn through the soil, a shield mounted in surrounding relationship to said spray nozzle, the shield having a flared trailing portion of greater width than the width of the tillage tool for creating a lateral fracture beneath the surface of the soil and the top of the shield extending in overhanging relationship to the bottom of the shield.

(References on following page)

References Cited in the file of this patent

UNITED STATES PATENTS

| | | |
|---|---|---|
| 1,087,006 | Fitzsimons | Feb. 10, 1914 |
| 1,122,147 | Moore | Dec. 22, 1914 |
| 2,322,256 | Rubens | June 22, 1943 |
| 2,424,520 | Tonkin | July 22, 1947 |
| 2,569,556 | Collins et al. | Oct. 2, 1951 |
| 2,598,121 | Hannibal | May 27, 1952 |

FOREIGN PATENTS

| | | |
|---|---|---|
| 951,823 | France | Apr. 18, 1949 |
| 677,359 | Germany | June 23, 1939 |